(12) United States Patent
Miyauchi et al.

(10) Patent No.: US 11,754,004 B2
(45) Date of Patent: Sep. 12, 2023

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Hirofumi Miyauchi, Kanagawa (JP); Michio Watanabe, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 10 days.

(21) Appl. No.: 17/625,141

(22) PCT Filed: Jul. 26, 2019

(86) PCT No.: PCT/JP2019/029525
§ 371 (c)(1),
(2) Date: Jan. 6, 2022

(87) PCT Pub. No.: WO2021/019626
PCT Pub. Date: Feb. 4, 2021

(65) Prior Publication Data
US 2022/0268220 A1 Aug. 25, 2022

(51) Int. Cl.
*F02D 13/02* (2006.01)
*F02D 23/00* (2006.01)
*F02D 41/00* (2006.01)

(52) U.S. Cl.
CPC ..... *F02D 13/0261* (2013.01); *F02D 13/0215* (2013.01); *F02D 23/00* (2013.01); *F02D 2041/001* (2013.01)

(58) Field of Classification Search
CPC .. F02D 13/0215; F02D 13/0261; F02D 23/00; F02D 41/0002; F02D 41/0007;
(Continued)

(56) References Cited

U.S. PATENT DOCUMENTS

| 6,234,144 B1 | 5/2001 | Yamaguchi et al. |
| 6,584,956 B2 | 7/2003 | Machida |

(Continued)

FOREIGN PATENT DOCUMENTS

| EP | 2 878 792 A1 | 6/2015 |
| JP | 2011-106339 A | 6/2011 |
| JP | 5012766 B2 | 8/2012 |

*Primary Examiner* — Audrey B. Walter
*Assistant Examiner* — Dapinder Singh
(74) *Attorney, Agent, or Firm* — Foley & Lardner LLP

(57) ABSTRACT

A control method for an internal combustion engine, the internal combustion engine including a valve timing control mechanism on at least an intake side and configured to control an operation of the valve timing control mechanism on the intake side during acceleration, the method including, calculating a relational expression between an intake valve timing, the intake valve timing being an operation timing of an intake valve, and a cylinder air charge amount in a range in which the intake valve timing can be advanced or retarded within a predetermined calculation cycle from a current value, calculating a target air charge amount, the target air charge amount being a target value of the cylinder air charge amount during the acceleration, based on an operating state of the internal combustion engine, calculating a target value of the intake valve timing corresponding to the target air charge amount from the relational expression for each calculation cycle, and setting a command signal for the valve timing control mechanism on the intake side based on a calculated target value of the intake valve timing.

8 Claims, 7 Drawing Sheets

(58) Field of Classification Search
CPC .............. F02D 41/0062; F02D 41/10; F02D 2041/001; F02D 2200/0402; F02D 2200/0414; F02D 2200/0406; Y02T 10/12; Y02T 10/40
See application file for complete search history.

(56) References Cited

U.S. PATENT DOCUMENTS

| | | | | |
|---|---|---|---|---|
| 2016/0032843 | A1* | 2/2016 | Ulrey | F02B 31/085 123/90.15 |
| 2016/0341133 | A1* | 11/2016 | Glugla | F02D 41/0007 |
| 2018/0291823 | A1* | 10/2018 | Hellstrom | F02D 41/0052 |

* cited by examiner (A)

(B)

CONTROL METHOD AND CONTROL DEVICE FOR INTERNAL COMBUSTION ENGINE

TECHNICAL FIELD

The present invention relates to a control method and a control device for an internal combustion engine that includes a valve timing control mechanism at least on an intake side and controls a cylinder air charge amount, which is an amount of air charged into a cylinder, by changing a valve timing of an intake valve.

BACKGROUND ART

JP 2011-106339 A discloses an internal combustion engine including a valve timing control mechanism on an intake side. A supercharging efficiency is predicted from a supercharging pressure and an in-cylinder gas amount both when a valve timing of an intake valve is advanced and when the valve timing is retarded. Further, the valve timing of the intake valve is changed in a direction in which the predicted supercharging efficiency becomes higher, for example, in an advance direction when the supercharging efficiency in an advance is higher than the supercharging efficiency in a retard (paragraphs 0007 to 0008).

SUMMARY OF INVENTION

In consideration of further improving control responsiveness of a cylinder air charge amount to a target torque during acceleration, an intake valve timing to be set as a target value is not constant during acceleration and involves a transient change. The technique disclosed in JP 2011-106339 A is intended to optimize the supercharging efficiency for the supercharging pressure and the in-cylinder gas amount on a premise that the technique is applied to a diesel engine, and does not correspond to implementation of a target intake valve timing involving the transient change.

An object of the present invention is to provide a control method and a control device for an internal combustion engine in consideration of the above problem.

A control method for an internal combustion engine according to one embodiment of the present invention is a control method for an internal combustion engine, the internal combustion engine including a valve timing control mechanism on at least an intake side and configured to control an operation of the valve timing control mechanism on the intake side during acceleration, the method including, calculating a relational expression between an intake valve timing, the intake valve timing being an operation timing of an intake valve, and a cylinder air charge amount in a range in which the intake valve timing can be advanced or retarded within a predetermined calculation cycle from a current value, calculating a target air charge amount, the target air charge amount being a target value of the cylinder air charge amount during the acceleration, based on an operating state of the internal combustion engine, calculating a target value of the intake valve timing corresponding to the target air charge amount from the relational expression for each calculation cycle, and setting a command signal for the valve timing control mechanism on the intake side based on a calculated target value of the intake valve timing.

A control method for an internal combustion engine according to other embodiment of the present invention is a control device for an internal combustion engine.

DESCRIPTION OF EMBODIMENTS

Hereinafter, an embodiment of the present invention is described with reference to the drawings.

(Overall Configuration of Internal Combustion Engine)

Figure 1:
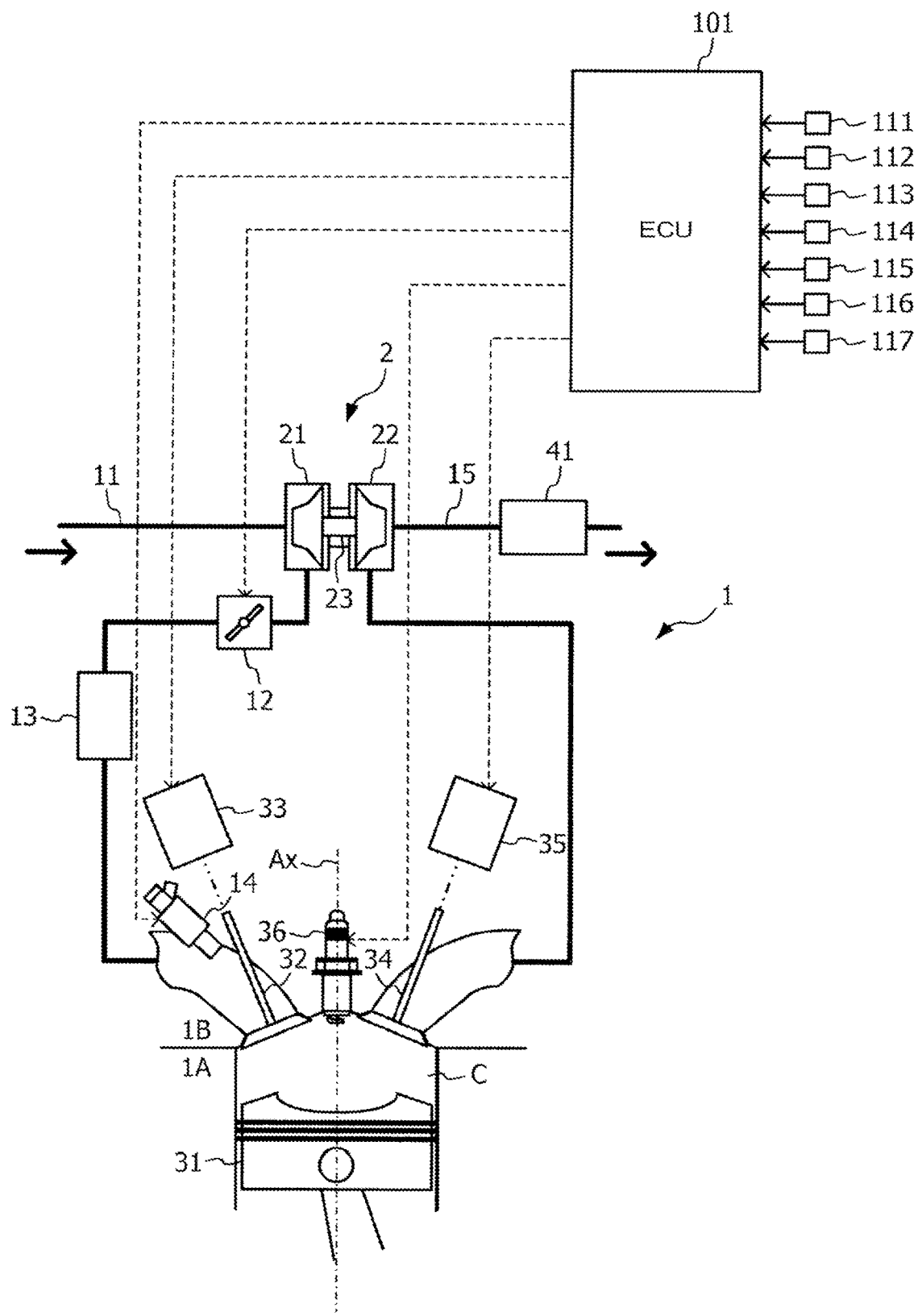
FIG. 1 is a schematic diagram showing an overall configuration of an internal combustion engine according to an embodiment of the present invention.

FIG. 1 shows an overall configuration of an internal combustion engine 1 according to an embodiment of the present invention.

The internal combustion engine (hereinafter, referred to as an "internal combustion engine" and simply referred to as an "engine" in some cases) 1 according to the embodiment is mounted on a vehicle and constitutes a drive source of the vehicle.

The internal combustion engine 1 includes a turbo supercharger 2. The supercharger 2 includes an intake compressor 21 and an exhaust turbine 22. The intake compressor 21 is interposed in an intake passage 11 of the internal combustion engine 1, and the exhaust turbine 22 is interposed in an exhaust passage 15. The intake compressor 21 and the exhaust turbine 22 are coupled to each other by a shaft 23. The exhaust turbine 22 receives a flow of exhaust gas, and rotation of the exhaust turbine 22 is transmitted to the intake compressor 21 via the shaft 23, whereby the intake compressor 21 rotates.

In the intake passage 11, an air cleaner (not shown) is disposed in an introduction portion. Regarding a flow of intake air, a throttle valve 12 is disposed downstream of the intake compressor 21, and an intercooler 13 is disposed downstream of the throttle valve 12. The air cleaner removes foreign matter contained in air taken into the intake passage 11 from the atmosphere. The throttle valve 12 can enlarge or contract a substantial opening area of the intake passage 11. In the embodiment, a main purpose of disposing the throttle valve 12 is to adjust a pressure in an intake manifold (hereinafter referred to as an "intake manifold pressure") rather than controlling an intake air amount. The intercooler 13 cools air compressed by the intake compressor 21. A fuel injection valve 14 is disposed further downstream of the intercooler 13 to be able to supply fuel into a cylinder. In the embodiment, the fuel injection valve 14 is embedded in a cylinder head 1B and injects the fuel toward an intake port.

A main body of the internal combustion engine 1 is divided into a cylinder block 1A and the cylinder head 1B. The cylinder block 1A and the cylinder head 1B are coupled to each other. A space defined between an upper surface of a piston 31 inserted into a cylinder bore of the cylinder block 1A and a lower surface of the cylinder head 1B is a combustion chamber C. The intake passage 11 communicates with the combustion chamber C via the intake port of the cylinder head 1B on one side, and the exhaust passage 15 communicates with the combustion chamber C via an exhaust port of the cylinder head 1B on the other side. An intake valve 32 is disposed in the intake port and an exhaust valve 34 is disposed in the exhaust port such that each port can be opened and closed.

Operations of the intake valve 32 and the exhaust valve 34 are controlled by valve timing control mechanisms 33 and 35 by changing an operation timing, that is, a valve timing. In the embodiment, the valve timing control mechanism (hereinafter, referred to as an "intake VTC" in some cases) 33 provided on an intake side and the valve timing control mechanism (hereinafter, referred to as an "exhaust VTC" in some cases) 35 provided on an exhaust side are configured such that an operating angle, which is a crank angle from an opening timing to a closing timing, is constant, and an operating center angle between the opening timing and the closing timing is changeable.

Here, in the embodiment, an operating center angle of the intake valve 32 is referred to as an "intake valve timing", and an operating center angle of the exhaust valve 34 is referred to as an "exhaust valve timing". However, the "valve timing" is not limited to this, and may be an opening timing or a closing timing of the intake valve 32 or the exhaust valve 34 depending on configurations of the valve timing control mechanisms 33 and 35. That is, the "valve timing" indicates a relative position of the opening timing of the intake valve 32 or the exhaust valve 34 with respect to a specific crank angle (for example, exhaust top dead center).

In addition to the above description, in the cylinder head 1B, a spark plug 36 is disposed on a cylinder center axis Ax. The spark plug 36 has a plug gap facing the combustion chamber C, and ignites a mixture of fuel and air formed in the combustion chamber C.

In the exhaust passage 15, regarding a flow of exhaust gas discharged from the combustion chamber C, an exhaust purification device 41 is disposed downstream of the exhaust turbine 22, and a muffler (not shown) is disposed downstream of the exhaust purification device 41. The exhaust purification device 41 incorporates a catalyst for exhaust purification.

The internal combustion engine 1 further includes an EGR system (not shown) that recirculates exhaust gas after combustion into the cylinder as EGR gas. In the embodiment, a low-pressure EGR system is employed. The low-pressure EGR system includes an EGR passage that communicates the exhaust passage 15 downstream of the exhaust turbine 22 and the intake passage 11 upstream of the intake compressor 21, and recirculates exhaust gas through the EGR passage.

(Basic Configuration of Control System)

An operation of the internal combustion engine 1 is controlled by an engine controller 101.

The engine controller 101 is an electronic control unit and includes a microcomputer including a central processing unit (CPU), various storage devices such as a RAM and a ROM, an input and output interface, and the like.

The engine controller 101 inputs detection signals of various operating state sensors that detect an operating state of the internal combustion engine 1, and periodically executes predetermined calculation based on a detected operating state to set a fuel injection amount, a fuel injection timing, an intake valve timing, an exhaust valve timing, an ignition timing, and the like of the internal combustion engine 1.

In the embodiment, examples of the operating state sensors include an accelerator sensor 111 that detects an operation amount (hereinafter referred to as an "accelerator position (accelerator opening degree)") APO of an accelerator pedal by a driver, a rotation speed sensor 112 that detects a revolution speed NE of the internal combustion engine 1, a coolant temperature sensor 113 that detects an engine coolant temperature TW, an intake manifold pressure sensor 114, an intake manifold temperature sensor 115, an exhaust manifold pressure sensor 116, an exhaust manifold temperature sensor 117, an air flow meter, a throttle sensor, an air-fuel ratio sensor, and the like (not shown).

The intake manifold pressure sensor 114 detects a pressure of air in a manifold portion of the intake passage 11 as an intake manifold pressure Pmani_i. The intake manifold temperature sensor 115 detects a temperature of the air in the manifold portion of the intake passage 11 as an intake manifold temperature Tmani_i. The exhaust manifold pressure sensor 116 detects a pressure of exhaust gas in a manifold portion of the exhaust passage 15 as an exhaust manifold pressure Pmani_e. The exhaust manifold temperature sensor 117 detects a temperature of the exhaust gas in the manifold portion of the exhaust passage 15 as an exhaust manifold temperature Tmani_e.

(Overview of Intake Valve Timing Control)

In the embodiment, a cylinder air charge amount Qint, which is an amount of air charged in the cylinder for each combustion cycle, is controlled for a target value or a required value of an engine torque corresponding to the accelerator position APO. When the cylinder air charge amount Qint is controlled, an intake valve timing VTCint is changed, and the intake manifold pressure Pmani_i is adjusted. The intake valve timing VTCint is changed by operating an intake VTC 33, and the intake manifold pressure Pmani_i is adjusted by operating the throttle valve 12.

The intake valve timing control according to the embodiment is generally as follows.

Figure 6:
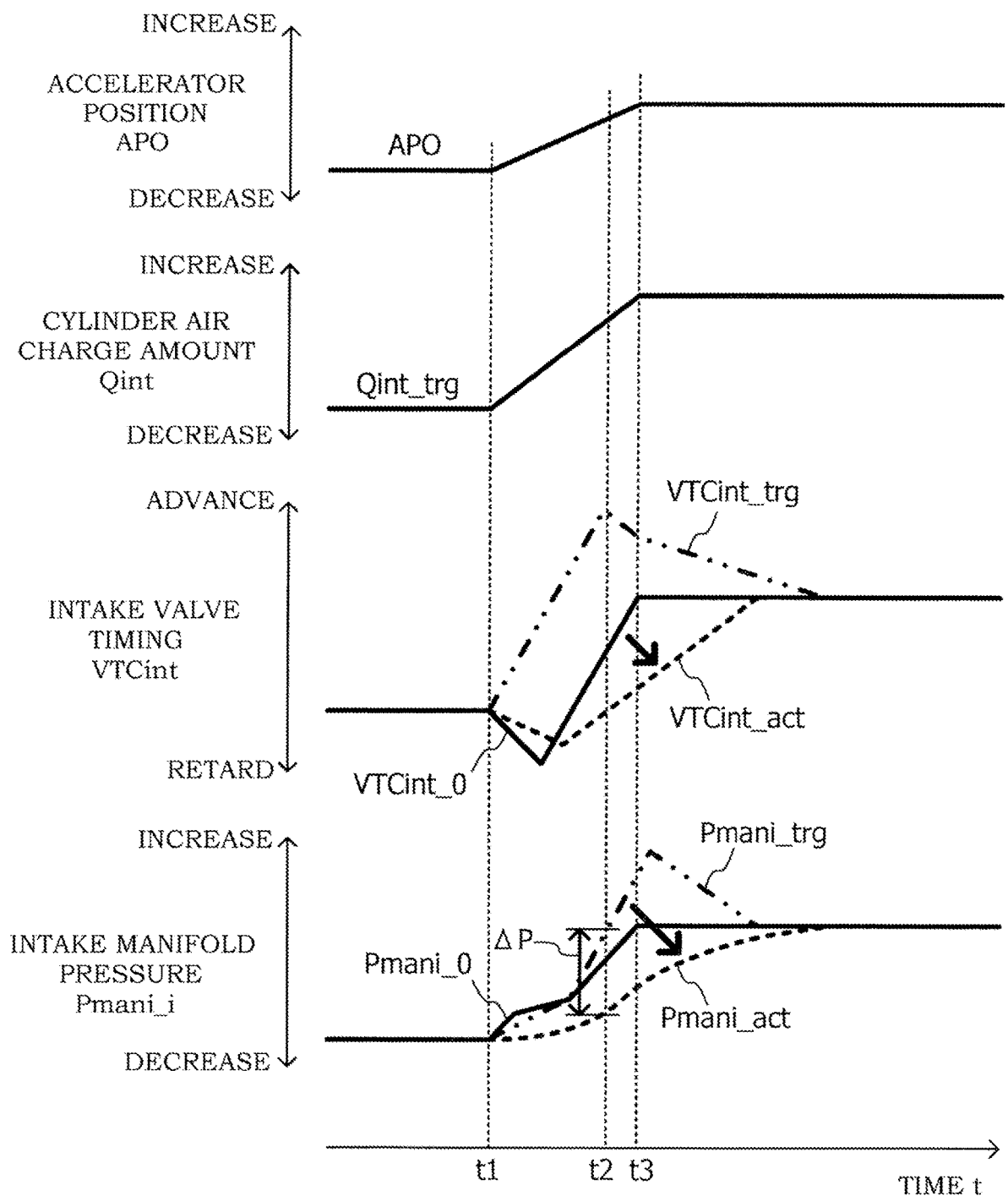
FIG. 6 is a time chart showing an operation during acceleration of the internal combustion engine according to the embodiment of the present invention.

FIG. 6 shows an operation of the internal combustion engine 1 according to the embodiment during acceleration by changes in the cylinder air charge amount Qint, the intake valve timing VTCint, and the intake manifold pressure Pmani_i with respect to a monotonic increase of the accelerator position APO. As a matter of course, a slope of each parameter such as the accelerator position APO with respect to time t gives priority to ease of understanding, and is not based on an actual scale.

It is assumed that the accelerator pedal is further depressed by the driver at time t1.

Based on the accelerator position APO and the engine revolution speed NE, a target value (hereinafter referred to as a "target air charge amount") Qint_trg of the cylinder air charge amount for achieving the required torque of the internal combustion engine 1 is calculated.

With reference to a calculation map that is set in advance according to the operating state and stored in the engine controller 101, a basic value (hereinafter referred to as a "basic intake valve timing") VTCint_0 of the intake valve timing and a basic value (hereinafter referred to as a "basic intake manifold pressure") Pmani_0 of the intake manifold pressure at which the target air charge amount Qint_trg can be achieved in a steady state are calculated. In the embodiment, based on a relative relation between a position of the piston 31 and the opening timing of the intake valve 32, the basic intake valve timing VTCint_0 is temporarily retarded and then advanced with respect to the monotonic increase in the accelerator position APO and a required engine torque. On the other hand, the basic intake manifold pressure Pmani_0 is increased in accordance with a change in the basic intake valve timing VTCint_0.

In addition to a delay caused by temporarily retarding the basic intake valve timing VTCint_0 before an advance, a delay due to a response delay or the like in a hydraulic system of the intake VTC 33 occurs in a change in an actual value (hereinafter referred to as an "actual intake valve timing") VTCint_act of the intake valve timing VTCint with respect to the basic intake valve timing VTCint_0. In order to compensate for the delay of the actual intake valve timing VTCint_act, the basic intake manifold pressure Pmani_0 is corrected. This correction is generally performed by setting a target value (hereinafter referred to as a "target intake manifold pressure") Pmani_trg of the intake manifold pressure Pmani_i larger than the basic intake manifold pressure Pmani_0 for a shortage of the actual intake valve timing VTCint_act relative to the basic value VTCint_0.

Similarly to the intake valve timing VTCint, a delay due to a response delay or the like in an air system downstream of the throttle valve 12 occurs in an actual value (hereinafter referred to as an "actual intake manifold pressure") Pmani_act of the intake manifold pressure Pmani_i. When depression of the accelerator pedal increases rapidly or greatly and a delay of the actual intake manifold pressure Pmani_act is remarkable (time t2), the target intake valve timing VTCint_trg is set by adjusting the intake valve timing VTCint away from setting by the calculation map, and the cylinder air charge amount Qint is forcibly brought close to the target value Qint_trg.

(Description by Flowchart)

Figure 2:
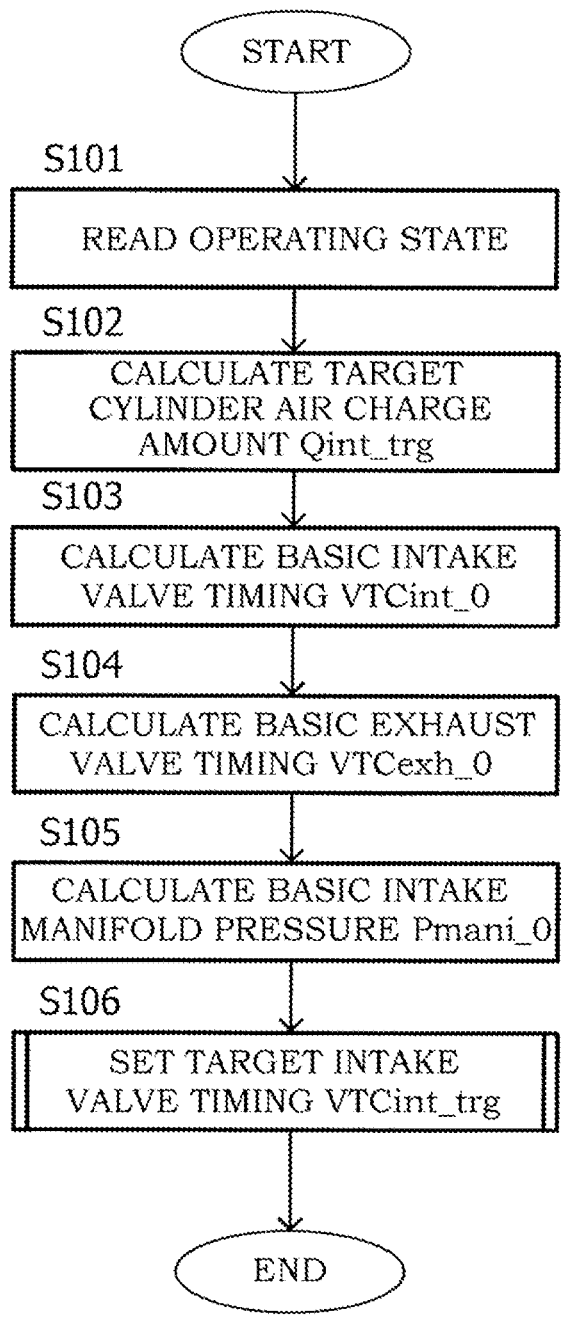
FIG. 2 is a flowchart showing a basic flow of intake valve timing control according to the embodiment.
Figure 3:
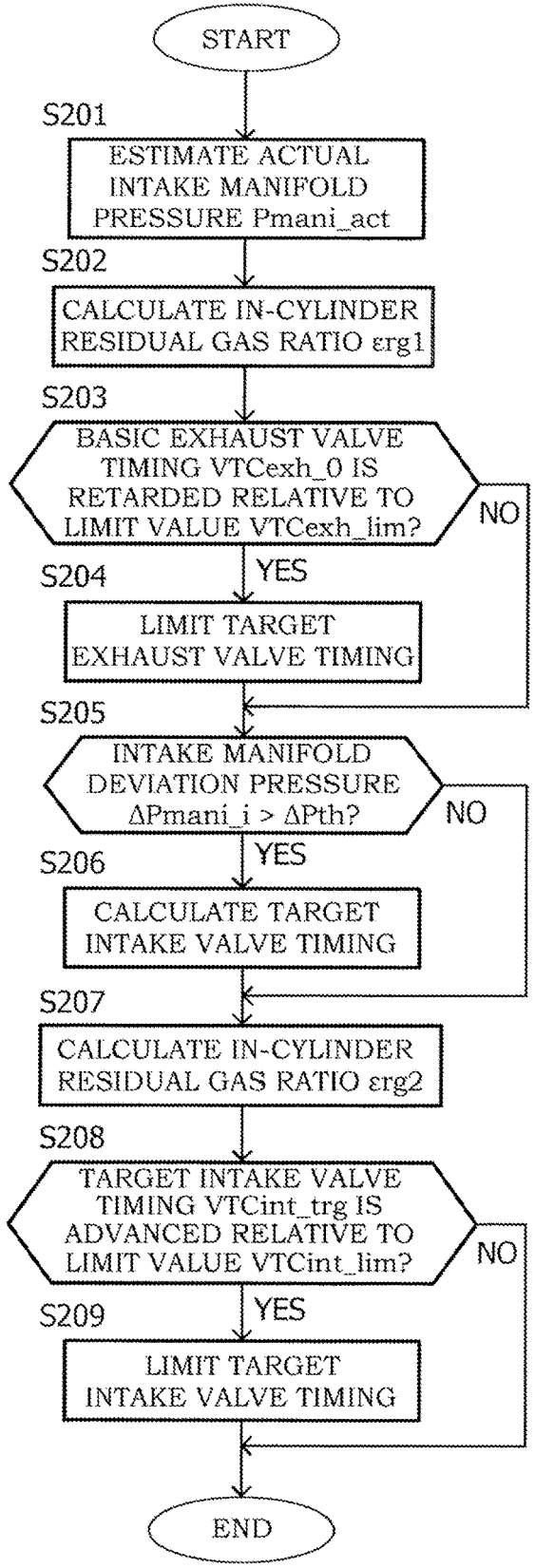
FIG. 3 is a flowchart showing contents of target intake valve timing setting processing in the intake valve timing control.

FIG. 2 shows a basic flow of the intake valve timing control as control executed by the engine controller 101. FIG. 3 shows a specific content of target intake valve timing setting processing (S106) in the intake valve timing control. The engine controller 101 is programmed to execute this control for each predetermined calculation cycle (for example, 10 ms) after a power supply is turned on by a key operation of the driver.

In the flowchart shown in FIG. 2, in S101, an operating state of the internal combustion engine 1 is read. The read operating state includes basic information relating to engine control, such as the accelerator position APO, the engine revolution speed NE, the coolant temperature TW, and the intake manifold pressure Pmani_i, the intake manifold temperature Tmani_i, the exhaust manifold pressure Pmani_e, the exhaust manifold temperature Tmani_e, a compression ratio Rcmp, and an EGR rate Regr.

In S102, the target air charge amount Qint_trg is calculated.

In S103, the basic intake valve timing VTCint_0 is calculated.

In S104, a basic exhaust valve timing VTCexh_0 is calculated. The basic exhaust valve timing VTCexh_0 is a basic value of an exhaust valve timing VTCexh corresponding to the operating state, and is obtained by referring to the calculation map.

In S105, the basic intake manifold pressure Pmani_0 is calculated.

In S106, the target intake valve timing VTCint_trg is set. The target intake valve timing VTCint_trg is set according to a procedure of the flowchart shown in FIG. 3.

Shifting to the flowchart shown in FIG. 3, in S201, the actual intake manifold pressure Pmani_act is estimated. This estimation is performed by taking into account of adaptation of a primary delay with respect to a detection value of the intake manifold pressure sensor 114.

In S202 to S204 and S207 to S209 to be described below, a valve overlap amount, which is a length of a period during which both the intake valve 32 and the exhaust valve 34 are opened, is limited. Specifically, from a viewpoint of appropriate management of an in-cylinder residual gas ratio εrg, the exhaust valve timing VTCexh is limited in S202 to S204, and the intake valve timing VTCint is limited in S207 to S209, thereby limiting the valve overlap amount. The "in-cylinder residual gas ratio" εrg refers to a ratio of exhaust gas carried over from a previous cycle to gas in the cylinder.

In S202 to S204, the target value (hereinafter referred to as a "target exhaust valve timing") VTCexh_trg of the exhaust valve timing VTCexh is limited such that an in-cylinder residual gas ratio εrg1 falls within an upper limit value εth of an allowable range of a residual gas amount.

Figure 4:
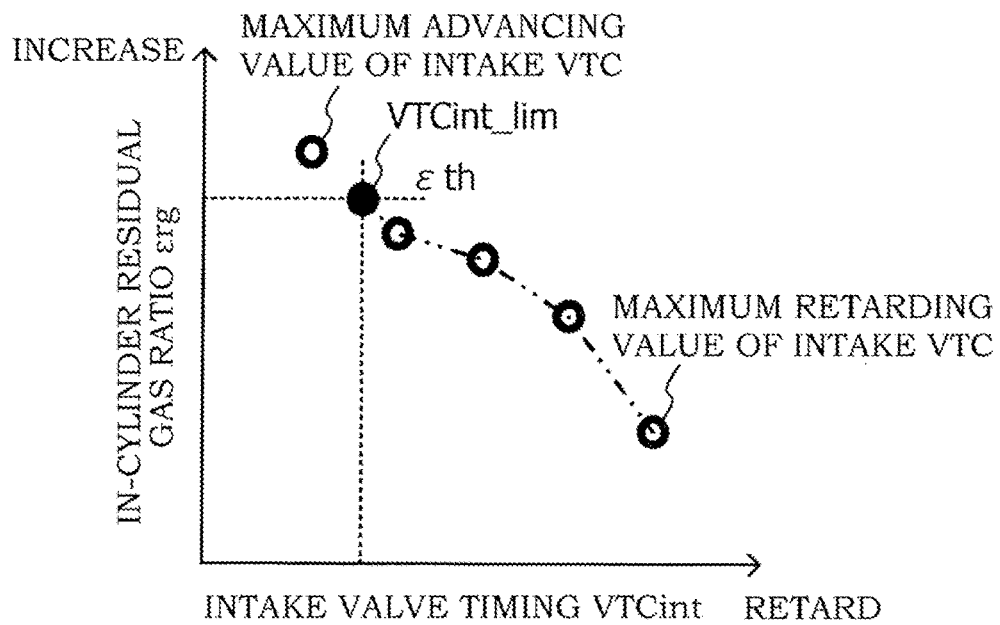
FIG. 4 is a diagram showing a relation between a valve timing of an intake valve and an in-cylinder residual gas ratio and a relation between a valve timing of an exhaust valve and the in-cylinder residual gas ratio.
Figure 4:
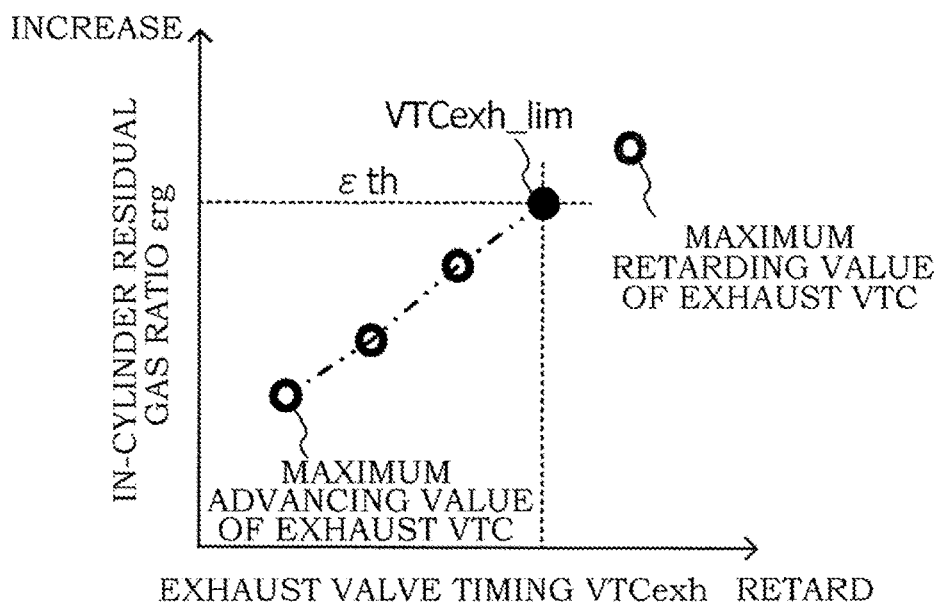

FIG. 4 shows a relation between the valve timing VTCint of the intake valve 32 and the in-cylinder residual gas ratio εrg and a relation between the valve timing VTCexh of the exhaust valve 34 and the in-cylinder residual gas ratio εrg. In the embodiment, as a general tendency, the in-cylinder residual gas ratio εrg tends to increase as the valve overlap amount increases. Specifically, the in-cylinder residual gas ratio εrg increases with respect to the intake valve timing VTCint due to a change to an advancing side as shown in (A) of FIG. 4, and increases with respect to the exhaust valve timing VTCexh due to a change to a retarding side as shown in (B) of FIG. 4.

The relation between the valve timing VTCexh of the exhaust valve 34 and the in-cylinder residual gas ratio εrg is obtained in advance based on the basic intake valve timing, the intake manifold pressure, the exhaust manifold pressure, and the like ((B) of FIG. 4). The exhaust valve timing VTCexh corresponding to the upper limit value εth of the in-cylinder residual gas ratio is calculated, and the calculated exhaust valve timing VTCexh is set as a limit value VTCexh_lim of the exhaust valve timing. When the basic exhaust valve timing VTCexh_0 obtained by referring to the calculation map is retarded beyond the limit value TCexh_lim (S203), the final target exhaust valve timing VTCexh_trg is set to the limit value VTCexh_lim (S204). In contrast, when the basic exhaust valve timing VTCexh_0 is advanced relative to the limit value TCexh_lim, the target exhaust valve timing VTCexh_trg is set to the basic exhaust valve timing VTCexh_0.

In S205 to S206, a delay occurring in the actual intake manifold pressure Pmani_act is compensated by adjusting or correcting the target intake valve timing VTCint_trg.

In S205, a deviation amount (hereinafter referred to as an "intake manifold deviation pressure") ΔPmani_i of the actual intake manifold pressure Pmani_act with respect to the target intake manifold pressure Pmani_trg is calculated, and it is determined whether the deviation amount ΔPmani_i is larger than a predetermined value ΔPth indicating that the delay of the actual intake manifold pressure Pmani_act is remarkable. In the embodiment, the intake manifold deviation pressure ΔPmani_i is calculated by subtracting the actual intake manifold pressure Pmani_act from the target intake manifold pressure Pmani_trg. When the intake manifold deviation pressure ΔPmani_i is larger than the predetermined value ΔPth, the processing proceeds to S206. When the intake manifold deviation pressure ΔPmani_i is equal to or less than the predetermined value ΔPth, the processing proceeds to S207. When the intake manifold deviation pressure ΔPmani_i is equal to or less than the predetermined value ΔPth, a provisional value of the target intake valve timing VTCint_trg is set to the basic intake valve timing VTCint_0.

In S206, the target intake valve timing VTCint_trg is calculated. Specifically, the following method is used.

Figure 5:
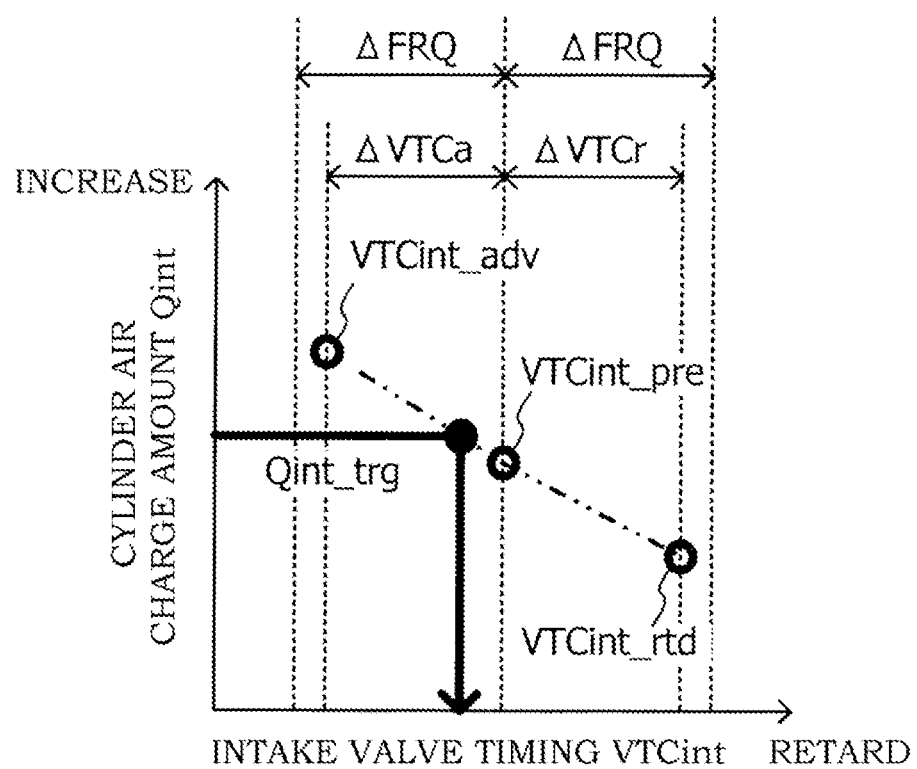
FIG. 5 is a diagram showing a relation between the valve timing of the intake valve and a cylinder air charge amount, and schematically shows an example of a calculation process of the target intake valve timing.

FIG. 5 shows a relation between the intake valve timing VTCint and the cylinder air charge amount Qint.

The cylinder air charge amount Qint is obtained by calculation on the vehicle, and a relational expression between a plurality of obtained points is calculated. The cylinder air charge amount Qint is obtained when the intake valve timing VTCint is changed from a current value (intake valve timing at the time of the previous control execution) VTCint_pre within a range (VTCint_adv to VTCint_rtd) in which the intake valve timing VTCint can be advanced or retarded within a calculation cycle ΔFRQ. In the embodiment, as a basis for calculating the relational expression, a point corresponding to the current value VTCint_pre of the intake valve timing VTCint, a point corresponding to a value VTCint_adv on the advancing side, and a point corresponding to a value VTCint_rtd on the retarding side are adopted, and the relational expression based on these points may be calculated, for example, by connecting adjacent points or by approximating a probable straight line. In the embodiment, complement between two points $(X_1, Y_1)$ and $(X_2, Y_2)$ on an X-Y coordinate is performed by the following calculation formula. An X coordinate corresponds to the target air charge amount Qint_trg, and a Y coordinate corresponds to the intake valve timing VTCint.

$$y = \{(Y_2 - Y_1)/(X_2 - X_1)\} \times (X - X_1) + Y_1 \quad (1)$$

The intake valve timing VTCint corresponding to the target air charge amount Qint_trg is calculated and is set as a provisional value of the target intake valve timing VTCint_trg.

The cylinder air charge amount Qint with respect to the intake valve timing VTCint can be calculated by fluid dynamic calculation based on states in the intake passage 11 and the exhaust passage 15 and a state in the cylinder, on the basis of a substantial opening area determined for each port by the intake valve timing VTCint and the exhaust valve timing VTCexh. In the embodiment, the cylinder air charge amount Qint is calculated based on the engine revolution speed NE, the intake valve timing VTCint, the exhaust valve timing VTCexh, the intake manifold pressure Pmani_i, the intake manifold temperature Tmani_i, the exhaust manifold pressure Pmani_e, the exhaust manifold temperature Tmani_e, the compression ratio Rcmp, the EGR rate Regr, and the coolant temperature TW. The following literature is an example of a calculation method applicable to the calculation of the cylinder air charge amount Qint according to the embodiment.

John B. Heywood (1989), "Internal Combustion Engine Fundamentals", McGraw-Hill Education, P. 205-234

In S207 to S209, the target intake valve timing VTCint_trg is limited such that an in-cylinder residual gas ratio εrg2 falls within the upper limit value εth described above.

The relation between the valve timing VTCint of the intake valve 32 and the in-cylinder residual gas ratio εrg is obtained in advance based on the target exhaust valve timing, the intake manifold pressure, the exhaust manifold pressure, and the like ((A) of FIG. 4). The intake valve timing VTCint corresponding to the upper limit value εth of the in-cylinder residual gas ratio is calculated, and the calculated exhaust valve timing VTCexh is set as a limit value VTCint_lim of the intake valve timing. When the target intake valve timing VTCint_trg (provisional value) calculated in S206 is advanced beyond the limit value VTCint_lim (S208), the final target intake valve timing VTCexh_trg is set to the limit value VTCint_lim (S209).

In the embodiment, the target intake valve timing VTCexh_trg is limited by rewriting the provisional value (S209).

Then, command signals corresponding to the target intake valve timing VTCexh_trg and the target exhaust valve timing VTCexh_trg are output to the intake VTC 33 and the exhaust VTC 35 (specifically, actuators that adjust a hydraulic pressure).

In the embodiment, the intake valve 32, the intake VTC 33, and the engine controller 101 constitute a "control device for an internal combustion engine". The engine controller 101 implements a function of a "valve timing controller" according to the embodiment.

(Description of Operation and Effect)

The internal combustion engine 1 and the control device thereof according to the embodiment have the above configurations, and effects obtained by the embodiment will be described below.

First, in the range VTCint_adv to VTCint_rtd in which the intake valve timing VTCint can be advanced or retarded within the predetermined calculation cycle ΔFRQ from the current value VTCint_pre, the relational expression between the intake valve timing VTCint and the cylinder air charge amount Qint is calculated, the target value VTCint_trg of the intake valve timing with respect to the target air charge amount Qint_trg is calculated for each calculation cycle from the relational expression, and an operation of the valve timing control mechanism 33 on the intake side is controlled based on the target value VTCint_trg. Accordingly, the target intake valve timing VTCint_trg can be calculated as an instantaneous value for each calculation cycle, and the target air charge amount Qint_trg accompanied by the transient change during acceleration can be achieved with high accuracy. Therefore, the control responsiveness of the cylinder air charge amount Qint can be improved, and power control of the internal combustion engine 1 can be further improved.

Second, by reflecting at least one of the intake manifold temperature Tmani_i, the intake manifold pressure Pmani_i, and the exhaust valve timing VTCexh in the calculation of the relational expression, the relational expression can be appropriately calculated, and the control responsiveness of the cylinder air charge amount Qint with respect to the target engine torque can be further improved.

Third, when the relational expression is calculated, the relational expression can be more appropriately calculated based on a plurality of intake valve timings VTCint and the cylinder air charge amount Qint.

Fourth, by adopting the limit value VTCint_lim relating to the intake valve timing and making it possible to avoid the setting of the target intake valve timing VTCint_trg at which the in-cylinder residual gas ratio εrg exceeds the upper limit value εth, it is possible to prevent an excessive increase in the in-cylinder residual gas ratio εrg and to avoid unstable combustion.

Further, in addition to the target intake valve timing VTCint_trg, the target exhaust valve timing VTCexh_trg is also limited from a viewpoint of the in-cylinder residual gas ratio ∈rg, and the setting of the target exhaust valve timing VTCexh_trg at which the in-cylinder residual gas ratio εrg exceeds the upper limit value εth can be avoided, whereby it is possible to more reliably avoid unstable combustion.

Fifth, in the internal combustion engine 1 in which a change in the cylinder air charge amount Qint during acceleration is particularly rapid, it is possible to improve the control responsiveness of the cylinder air charge amount Qint and to further improve a power performance of the internal combustion engine 1 by applying the control device to the internal combustion engine 1 including the supercharger 2.

In the above description, as shown in FIG. 5, the point corresponding to the current value VTCint_pre of the intake valve timing, the point corresponding to the value VTCint_adv closer to the current value than the limit value on the advancing side, and the point corresponding to the value VTCint_rtd closer to the current value than the limit value on the retarding side are adopted as a basis for calculating the relational expression between the intake valve timing VTCint and the cylinder air charge amount Qint. However, points as the basis are not limited to these points, and instead of or in addition to these points, a limit value on the advancing side (−ΔFRQ) and a limit value on the retarding side (+ΔFRQ) can be adopted. Further, when the intake valve timing VTCint_std set in a steady state under a corresponding operating state is within a changeable range RNG, this steady point can be included.

Figure 7:
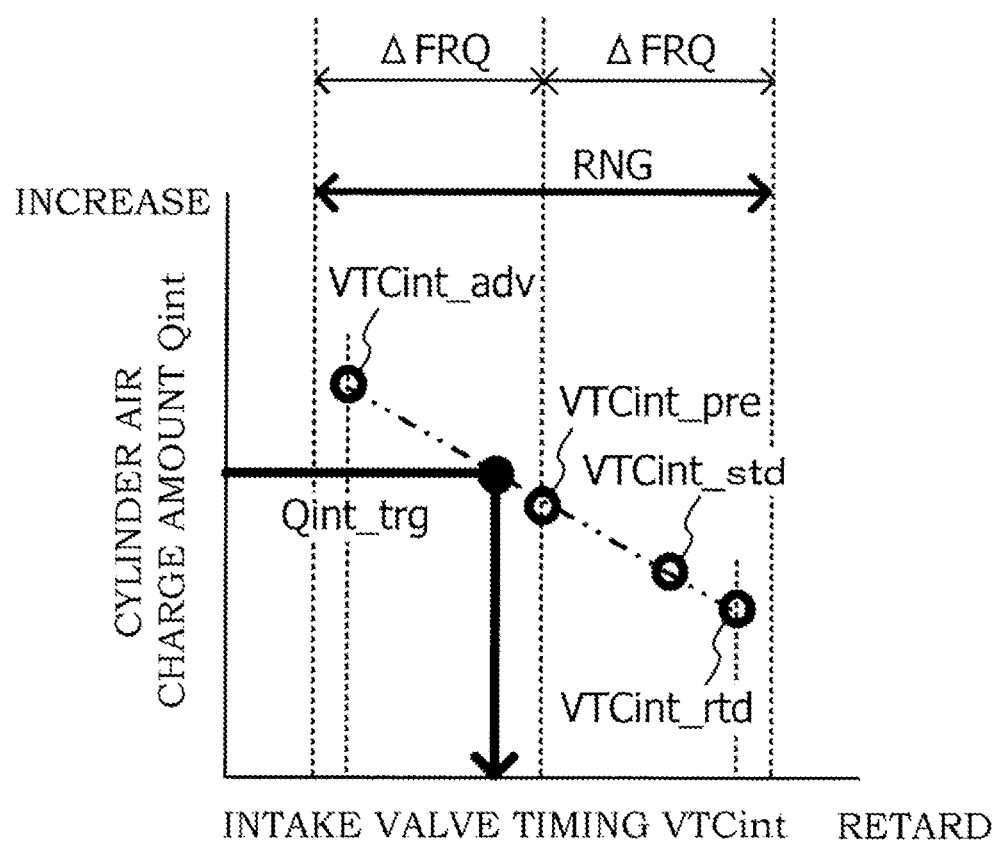
FIG. 7 is a diagram showing the relation between the valve timing of the intake valve and the cylinder air charge amount, and schematically shows another example of the calculation process of the target intake valve timing.

FIG. 7 shows the relation between the intake valve timing VTCint and the cylinder air charge amount Qint, and shows an example in which a point corresponding to the intake valve timing VTCint_std set in the steady state is provided. In this way, by providing the steady point, it is possible to calculate the relational expression based on more points and to improve reliability of the relational expression.

In the above description, as the valve timing control mechanisms 33 and 35 provided on the intake side and the exhaust side, those having a variable operating center angle while keeping an operating angle constant are adopted, but the valve timing control mechanisms 33 and 35 are not limited thereto. The valve timing control mechanisms 33 and 35 may be formed such that the operating angle or a valve lift amount is variable instead of or in addition to the operating center angle.

Although the embodiment of the present invention has been described above, the above embodiment is only a part of application examples of the present invention, and does not mean that the technical scope of the present invention is limited to the specific configurations of the above embodiment. Various changes and modifications can be made to the above embodiment within the scope of the matters described in the claims.

The invention claimed is:

1. A control method for an internal combustion engine, the internal combustion engine including a valve timing control mechanism on at least an intake side and configured to control an operation of the valve timing control mechanism on the intake side during acceleration, the method comprising:
calculating a relational expression between an intake valve timing, the intake valve timing being an operation timing of an intake valve, and a cylinder air charge amount, based on a plurality of intake valve timing values and a plurality of cylinder air charge amount values corresponding to the intake valve timing values, all of the intake valve timing values being in a range in which the intake valve timing can be advanced or retarded within a predetermined calculation cycle from a current value;
calculating a target air charge amount, the target air charge amount being a target value of the cylinder air charge amount during the acceleration, based on an operating state of the internal combustion engine;
calculating a target value of the intake valve timing corresponding to the target air charge amount from the relational expression for each calculation cycle; and
setting a command signal for the valve timing control mechanism on the intake side based on a calculated target value of the intake valve timing.

2. The control method for an internal combustion engine according to claim 1, further comprising:
calculating the relational expression based on at least one of an intake temperature, an intake pressure, and a valve timing of an exhaust valve.

3. The control method for an internal combustion engine according to claim 1, wherein
the plurality of intake valve timings include an intake valve timing set in a steady state under the operating state.

4. The control method for an internal combustion engine according to claim 1, further comprising:
limiting a target value of the intake valve timing to a retarding side relative to a limit value of the intake valve timing, the limit value keeping an in-cylinder residual gas ratio to a predetermined upper limit value or less, the in-cylinder residual gas ratio being a ratio of exhaust gas carried over from a previous cycle to gas in the cylinder.

5. The control method for an internal combustion engine according to claim 1, wherein
the internal combustion engine includes a valve timing control mechanism on an exhaust side in addition to the valve timing control mechanism on the intake side, and
the method further comprises:
controlling operations of the valve timing control mechanisms on the intake side and the exhaust side during the acceleration; and
setting target values of the intake valve timing and an exhaust valve timing such that an in-cylinder residual gas ratio, the in-cylinder residual gas ratio being a ratio of exhaust gas carried over from a previous cycle to gas in the cylinder, falls within a predetermined upper limit value or less.

6. The control method for an internal combustion engine according to claim 1, wherein
the internal combustion engine includes a supercharger operable during the acceleration.

7. A control device for an internal combustion engine, the control device comprising:
an intake valve;
a valve timing control mechanism configured to drive the intake valve at different intake valve timings; and
a valve timing controller configured to control an operation of the valve timing control mechanism during acceleration, wherein:
the valve timing controller is further configured to:
calculate a relational expression between an intake valve timing and a cylinder air charge amount, based on a plurality of intake valve timing values and a plurality of cylinder air charge amount values corresponding to the intake valve timing values, all of the intake valve timing values being in a range in which the intake valve timing can be advanced or retarded within a predetermined calculation cycle from a current value;
detect an operating state of the internal combustion engine;

calculate a target air charge amount, the target air charge amount being a target value of the cylinder air charge amount during the acceleration, based on the detected operating state;

calculate a target value of the intake valve timing corresponding to the target air charge amount from the relational expression for each calculation cycle; and set a command signal for the valve timing control mechanism on an intake side based on the calculated target value of the intake valve timing.

8. A control method for an internal combustion engine, the internal combustion engine including a valve timing control mechanism on at least an intake side and configured to control an operation of the valve timing control mechanism on the intake side during acceleration, the method comprising:

calculating a relational expression between an intake valve timing, the intake valve timing being an operation timing of an intake valve, and a cylinder air charge amount in a range in which the intake valve timing can be advanced or retarded within a predetermined calculation cycle from a current value;

calculating a target air charge amount, the target air charge amount being a target value of the cylinder air charge amount during the acceleration, based on an operating state of the internal combustion engine;

calculating a target value of the intake valve timing corresponding to the target air charge amount from the relational expression for each calculation cycle;

setting a command signal for the valve timing control mechanism on the intake side based on a calculated target value of the intake valve timing; and limiting a target value of the intake valve timing to a retarding side relative to a limit value of the intake valve timing, the limit value keeping an in-cylinder residual gas ratio to a predetermined upper limit value or less, the in-cylinder residual gas ratio being a ratio of exhaust gas carried over from a previous cycle to gas in the cylinder.

\* \* \* \* \*